(12) United States Patent
Ravichandran

(10) Patent No.: US 10,129,326 B1
(45) Date of Patent: Nov. 13, 2018

(54) EMERGENCY CALLING WITH A TELEPHONY APPLICATION

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/631,403

(22) Filed: Jun. 23, 2017

(51) Int. Cl.

| | |
|---|---|
| *H04M 3/51* | (2006.01) |
| *H04W 4/90* | (2018.01) |
| *H04W 76/50* | (2018.01) |
| *H04L 29/08* | (2006.01) |
| *H04M 1/725* | (2006.01) |
| *H04M 1/247* | (2006.01) |
| *H04L 29/06* | (2006.01) |
| *H04Q 3/545* | (2006.01) |
| *H04M 7/00* | (2006.01) |
| *H04Q 3/00* | (2006.01) |
| *H04L 12/16* | (2006.01) |

(52) U.S. Cl.
CPC .............. *H04L 67/04* (2013.01); *H04L 12/16* (2013.01); *H04L 65/1096* (2013.01); *H04L 69/12* (2013.01); *H04M 1/2473* (2013.01); *H04M 1/72522* (2013.01); *H04M 1/72525* (2013.01); *H04M 7/0012* (2013.01); *H04Q 3/0054* (2013.01); *H04Q 3/54583* (2013.01)

(58) Field of Classification Search
CPC ......... H04L 67/04; H04L 12/16; H04L 69/12; H04L 65/1096; H04M 7/0012; H04M 1/72525; H04M 1/2473; H04M 1/72522; H04B 17/00; H04Q 3/0054; H04Q 3/54583

See application file for complete search history.

(56) References Cited

U.S. PATENT DOCUMENTS

| | | | |
|---|---|---|---|
| 2005/0134455 A1* | 6/2005 | Binning | G08B 7/064 340/539.18 |
| 2009/0141707 A1* | 6/2009 | Kavanaugh | H04L 63/0272 370/352 |

(Continued)

OTHER PUBLICATIONS

Schulzrinne, H. A Uniform Resource Name (URN) for Emergency and Other Well-Known Services. [online]. Network Working Group, Columbia University, Jan. 2008. [retrieved on Jun. 5, 2018]. Retrieved from the Internet URL: https://tools.ietf.org/html/rfc5031.

*Primary Examiner* — Andrew Wendell
(74) *Attorney, Agent, or Firm* — Han Santos, PLLC

(57) ABSTRACT

Techniques are disclosed for implementing emergency calling with a telephony application. In some examples, an application that executes on a user device provides voice communication functionality. Where a user attempts to contact an emergency number via this application (e.g., 911), the application can first determine whether the application is executing on a mobile phone or on a tablet. Where the application is executing on a mobile phone, the application can invoke a telephone dialer functionality provided by the mobile device to call the emergency service. Where the application is executing on a tablet, the application can access the emergency service via a uniform resource name for the emergency service.

20 Claims, 8 Drawing Sheets

(56) References Cited

U.S. PATENT DOCUMENTS

| | | | | |
|---|---|---|---|---|
| 2013/0027743 | A1* | 1/2013 | Enami | G06F 3/1204 |
| | | | | 358/1.15 |
| 2013/0029634 | A1* | 1/2013 | Li | H04W 4/22 |
| | | | | 455/404.2 |
| 2013/0301607 | A1* | 11/2013 | McCann | H04W 36/0072 |
| | | | | 370/331 |
| 2016/0007177 | A1* | 1/2016 | De Leo | H04W 4/22 |
| | | | | 455/404.2 |
| 2016/0029197 | A1* | 1/2016 | Gellens | G05D 1/0011 |
| | | | | 455/404.1 |
| 2016/0330600 | A1* | 11/2016 | Abbott | H04W 4/16 |
| 2017/0134444 | A1* | 5/2017 | Buckley | H04L 65/1069 |
| 2017/0177333 | A1* | 6/2017 | Busayarat | G06F 8/71 |

* cited by examiner

US 10,129,326 B1

EMERGENCY CALLING WITH A TELEPHONY APPLICATION

BACKGROUND

User devices (sometimes referred to as user equipment) include tablet computers and mobile phones. Various user devices can either include or omit voice communications capability using a cellular telecommunications network. These user devices can also execute applications that offer voice communications functionality. While a user is interacting with an application on his or her mobile device that offers voice communications functionality, that user can desire to contact an emergency service, such as 911.

BRIEF DESCRIPTION OF THE DRAWINGS

The Detailed Description is set forth with reference to the accompanying Figures.

DETAILED DESCRIPTION

Overview

Figure 1:
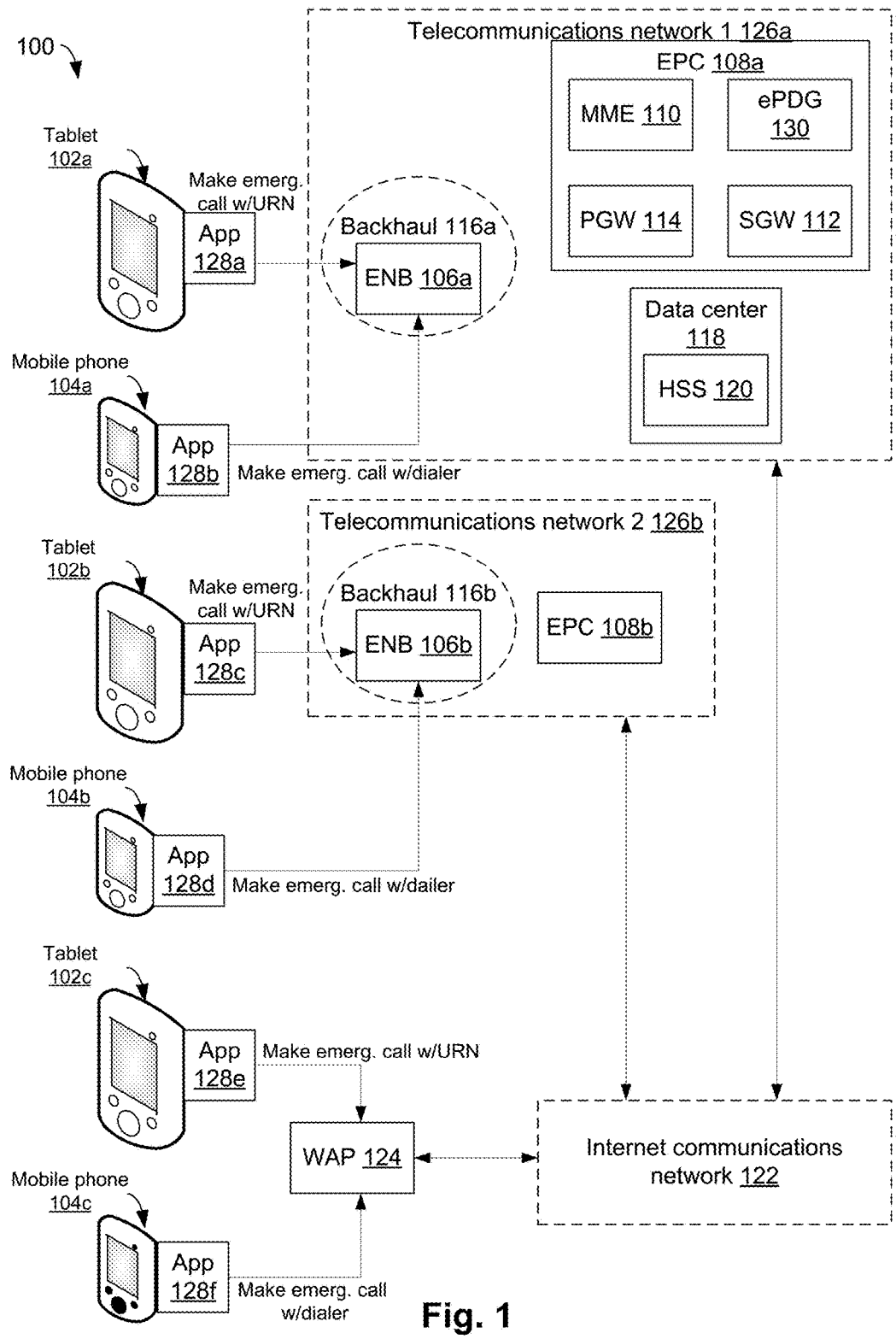
FIG. 1 illustrates an example system architecture for emergency calling with a telephony application.

There are predefined emergency telephone numbers (and predefined numbers for non-emergency services), and the specific predefined telephone number can vary by geographical area. An example within the North American Numbering Plan, which includes the United States and Canada, is 911 for emergency services.

By calling 911, a caller is connected with an emergency dispatch office that has jurisdiction over the caller's physical location, and that can send an emergency responder to the caller's physical location in case of an emergency. In some instances, calling 911 accesses an Enhanced 911 (E911) system that pairs caller information with a physical address. Example predefined emergency telephone numbers in other geographical areas include 112 and 999 in England; 065, 068, and 060 for ambulance, fire, and police, respectively, in Mexico; and 000 or 112 (on a mobile phone) in Australia.

There are also predefined telephone numbers for non-emergency services. Examples within the North American Numbering Plan that allow access to specific non-emergency services with a three-digit telephone number include 811 for underground public utility locations, 611 for relay services for the deaf and hard of hearing, 411 for directory services, and 311 for non-emergency municipal government services.

In addition to accessing these emergency and non-emergency services via a telephone, such as a mobile phone, a caller can attempt to access one of these services via an application that executes on a mobile phone (or other computing device), where this application provides voice communication functionality. In some types of application-based telephony systems, it can be difficult to route emergency calls to the appropriate emergency service. Here, a telephony application (i.e., an application that can be executed on a user device to provide for telephony functionality) can invoke a uniform resource name (URN) to place an emergency call.

In some examples, invoking a URN to place the emergency call can comprise the telephony application implementing a Request for Comment (RFC) 5031 protocol that defines a URN to access an emergency service. An example of a URN is urn:service:sos, which can define access to an emergency service, similar to dialing 911 from a landline telephone. In such a protocol, there can be a URN namespace as well as resolution protocols to resolve a URN to a corresponding telephone number.

Thus, in the present application, where a telephony application executes on a user device that is mobile phone, the telephony application can determine that the telephony application executes on a mobile phone based on determining that a screen size of the user device corresponds to a screen size of a mobile phone. Where the telephony application executes on a mobile phone, the telephony application can effectuate an emergency call by invoking a dialer functionality of an operating system of the mobile phone. A mobile phone can be likely to possess dialer functionality in the operating system as well as one or more cellular radios involved with placing a telephone call in this manner.

Instead, where the telephony application executes on a user device other than a mobile phone (e.g., a tablet, a laptop computer, or a desktop computer), the telephony application can invoke a URN within the telephony application with which to make the emergency call.

Exemplary Hardware, Software and Communications Environment

FIG. 1 illustrates an example system architecture for emergency calling with a telephony application. It can be appreciated that this Figure shows an example of a network architecture, and that there can be other network architectures in which emergency calling with a telephony application can be implemented. As depicted, there are six user devices in example network architecture 100—tablet 102a, tablet 102b, tablet 102c, mobile phone 104a, mobile phone 104b, and mobile phone 104c. Each of these user devices can execute a telephony application that provides for telephony services. It can be appreciated that a user device can generally refer to a computing device, such as a mobile phone, a tablet, a laptop computer, or a desktop computer.

In general, a tablet is a type of computing device with a larger screen than a mobile phone, and which lacks an implementation of cellular telecommunications radios that are used to place voice communications calls across a telecommunications network (in contrast to telephony that can be implemented over a data connection of the tablet). Additionally, in general, a mobile phone is a type of computing device with a smaller screen than a tablet, and which possesses an implementation of cellular telecommunications radios that are used to place voice communications calls across a telecommunications network (and which also can implement telephony via a data connection of the mobile phone).

Each of tablets 102a-c and mobile phones 104a-c executes a telephony application, which are, respectively, telephony application 128a, telephony application 128b, telephony application 128c, telephony application 128d, telephony application 128e, and telephony application 128f. Each of telephony applications 128a-f are configured to provide a user with telephony services via one or more phone numbers that are separate from a phone number that is associated with a subscriber identification module (SIM) card of the corresponding user device. Additionally, two telephony applications can provide telephony service via the same phone number—e.g., tablet 102a and mobile phone 104a can both be configured to provide telephony services using the same phone number, so that if someone else calls that number, both of those user devices ring.

Each of telephony applications 128a-f registers to telecommunications network 1 126a via, e.g., sending a user name and password to telecommunications network 1 126a that telecommunications network 1 126a validates. The telecommunications network that a telephony application registers to can differ from the telecommunications network that is registered to by a corresponding user device. That is, tablet 102b and mobile phone 104b are registered to telecommunications network 2 126b, but the telephony applications that execute on tablet 102b and mobile phone 104b (telephony application 128c and telephony application 128d) are registered to telecommunications network 1 126a.

In contrast, tablet 102a and mobile phone 104a are registered to telecommunications network 1 126a and also the telephony applications that execute on tablet 102a and mobile phone 104a (telephony application 128a and telephony application 128b) are registered to telecommunications network 1 126a.

Then, tablet 102c and mobile phone 104c are not directly connected to a telecommunications network. Instead, they are in communication with wireless access point (WAP) 124, which provides a wireless communications channel between tablet 102c and mobile phone 104c and Internet communications network 122. Telephony application 128e and telephony application 128f, which execute on tablet 102c and mobile phone 104c, respectively, are registered to telecommunications network 1 126a.

Tablet 102a and mobile phone 104a generally connect to telecommunications network 1 126a. Telecommunications network 1 126a comprises evolved node B (eNB) 106a, backhaul 116a, evolved packet core (EPC) 108a, and data center 118. Within telecommunications network 1 126a, tablet 102a and mobile phone 104a connect to eNB 106a, which is part of backhaul 116a.

Backhaul 116a (and backhaul 116b) comprises a communications connection between a core of a telecommunications network and an edge to which a user device can connect. eNB 106a is a point in a telecommunications network that connects with user devices, such as tablet 102a and mobile phone 104a. eNB 106a can send and receive wireless communications with user devices.

eNB 106a is connected with Mobile Management Entity (MME) 110 of EPC 108a. MME 110 is configured to find, route, maintain, and transfer communications. MME 110 is configured to perform end-to-end connection signaling and security services between core networks, and to maintain connection information about user devices, and determine which gateway is to be used to connect a user device to another network.

MME 110 is connected with SGW 112. SGW 112 is configured to route and forward data packets, and act as an anchor for network connectivity when tablet 102a physically moves so is handed off from eNB 106a to another eNB associated with EPC 108a. A user device, such as tablet 102a, can be associated with a single SGW, such as SGW 112, and MME 110 can determine that tablet 102a will utilize SGW 112 for a current session. In an architecture that includes a visited network and a home network, SGW 112 is also configured to be a point of contact the visited network with the home network, by communicating with a packet gateway (PGW) (such as PGW 114) of the home network.

In addition to being configured to be a point of contact between the visited network and the home network, PGW 114 is configured to perform such functions as managing quality of service (QoS) for communications (such as communications to or from tablet 102a), performing deep packet inspection, and performing a Policy and Charging Enforcement Function (PCEF).

PGW 114 communicates with data center 118 via Internet communications network 122. Data center 118 can include home subscriber server (HSS) 120. HSS 120 is a master user database that contains subscriber profiles for one or more user device users that are associated with the home network, performs authentication and authorization for a user's user device, and can provide information about a user device's physical location and Internet Protocol (IP) information.

The other user devices depicted (i.e., tablets 102b-c and mobile phones 104b-c) can also register and communicate their state information to HSS 120, though they via a different path through this system architecture of FIG. 1 than for tablet 102a and mobile phone 104a. Both tablet 102b and mobile phone 104b connect to telecommunications network 2 126b. Telecommunications network 2 126b comprises eNB 106b, backhaul 116b, and EPC 108b.

Both tablet 102c and mobile phone 104c are communicatively coupled to WAP 124. WAP 124 is configured to provide a WiFi communications link between tablet 102c and HSS 120, and between mobile phone 104c and HSS 120.

WAP 124 is connected through Internet communications network 122 to EPC 108a, and can connect to EPC 108a via evolved packet data gateway (ePDG) 130. ePDG 130 can secure a data transmission with a user device, such as tablet 102a, as the user device connects to EPC 108a via a communications link that does not adhere to a 3rd Generation Partnership Project (3GPP) protocol. In this capacity, ePDG 130 can serve as a termination node of an Internet Protocol Security (IPsec) tunnel that is established with tablet 102c.

Within this system architecture of FIG. 1, and as described in more detail with respect to FIGS. 2-8, when telephony applications 128a-f are configured to place emergency calls. Telephony applications 128a, 128c, and 128e are configured to place emergency calls via invoking a URN. Then telephony applications 128b, 128d, and 128f are configured to place emergency calls via invoking a dialer functionality of the mobile phone upon which they execute.

As depicted, each of these telephony applications 128a-f are registered to telecommunications network 1 126a, and are configured to place an emergency call independent of whether the corresponding user device is also registered to telecommunications network 1 126a (i.e., tablet 102a and mobile phone 104a are registered to telecommunications network 1 126a, tablet 102b and mobile phone 104b are registered to telecommunications network 2 126b, and tablet 102c and mobile phone 104c are not registered to telecommunications network 1 126a or telecommunications network 2 126b).

Figure 2:
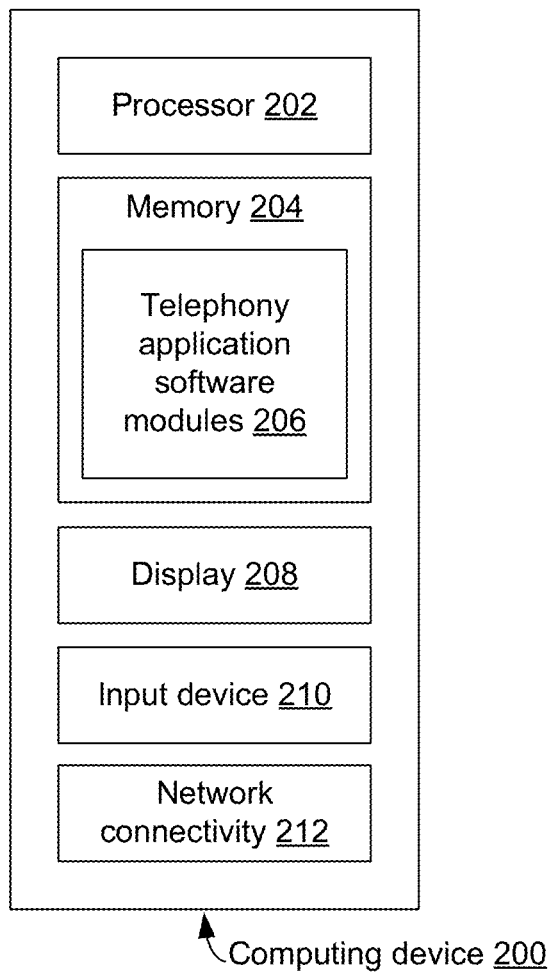
FIG. 2 illustrates an example block diagram of various components of a computing device for implementing emergency calling with a telephony application.

FIG. 2 illustrates an example block diagram of various components of a computing device for implementing emergency calling with a telephony application.

As depicted, FIG. 2 contains computing device 200. In some examples, computing device 200 can be a user device (like one of tablets 102a-102c or mobile phones 104a-104c of FIG. 1) such as a cellular telephone, or a computer server. In other examples, computing device can be another type of computing device, such as a desktop computer or a laptop computer.

In some examples, instances of computing device 200 can be used to implement one or more of tablet 102a, tablet 102b, tablet 102c, mobile phone 104a, mobile phone 104b, mobile phone 104c, eNodeB 106a, eNodeB 106b, WAP 124, EPC 108a, EPC 108b, MME 110, SGW 112, PGW 114, ePDG 130, and HSS 120 of FIG. 1.

Computing device 200 contains several components, including processor 202, memory 204, display 208, input device 210, and network connectivity 212.

Processor 202 is a microprocessor, such as a central processing unit (CPU) that is configured to execute computer-executable instructions, including computer-executable instructions that make up telephony application software modules 206 of memory 204. Memory 204 can be implemented using computer-readable media, such as computer storage media, that is configured to store computer-executable instructions. Computer-readable media includes, at least, two types of computer-readable media, namely computer storage media and communications media.

Computer storage media includes non-transitory volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory and/or storage technology, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication media.

Telephony application software modules 206 as stored in the memory 204 are a set of computer executable instructions stored together as a discrete whole. Examples of software modules include binary executables such as static libraries, dynamically linked libraries, and executable programs. Other examples of software modules include interpreted executables that are executed on a run time such as servlets, applets, p-Code binaries, and Java binaries. Software modules include computer-executable instructions that can run in kernel mode and/or user mode. Telephony application software modules 206 can comprise a set of computer executable instructions that, when executed on processor 202, implement at least one of the operating procedures of one or more of FIGS. 3-8. In some embodiments, the telephony application software modules 206 may be a part of a telephony application and/or an operating system. In embodiments in which the computing device 200 is a mobile phone, the operating system that resides in the memory 204 may include a dialer functionality. Display 208 is a display, such as a liquid crystal display (LCD), that is configured to display visual output by computing device 200. Input device 210 is computer hardware configured to receive and process user input, such as touch input, or physical buttons that a user can press, as with a mouse or keyboard. Where input device 210 is configured to receive tough input, input device 210 and display 208 can together form a touchscreen.

Network connectivity 212 can one or more radios configured to send and/or receive wireless communications. Network connectivity 212 can be configured to send and receive cellular network communications, such as via a Long-Term Evolution (LTE), Voice over LTE (VoLTE), or LTE in unlicensed spectrum (LTE-u) protocol. Network connectivity 212 can also be configured to send wireless local area network communications, such as via a WiFi protocol, or another 802.11 protocol. Network connectivity 212 can also be configured to communicate via physical connection, such as via a Transmission Control Protocol/Internet Protocol (TCP/IP) protocol via an Ethernet cable.

One or more instances of the computing device 200 can be used to implement aspects of the disclosure, such as to implement the operating procedures of one or more of FIGS. 3-8. For example, the operating procedures of FIGS. 3-8 can be stored in memory 204 as telephony application software modules 206 and executed by processor 202.

Determining What Type of Device a Telephony Application Executes on

Figure 3:
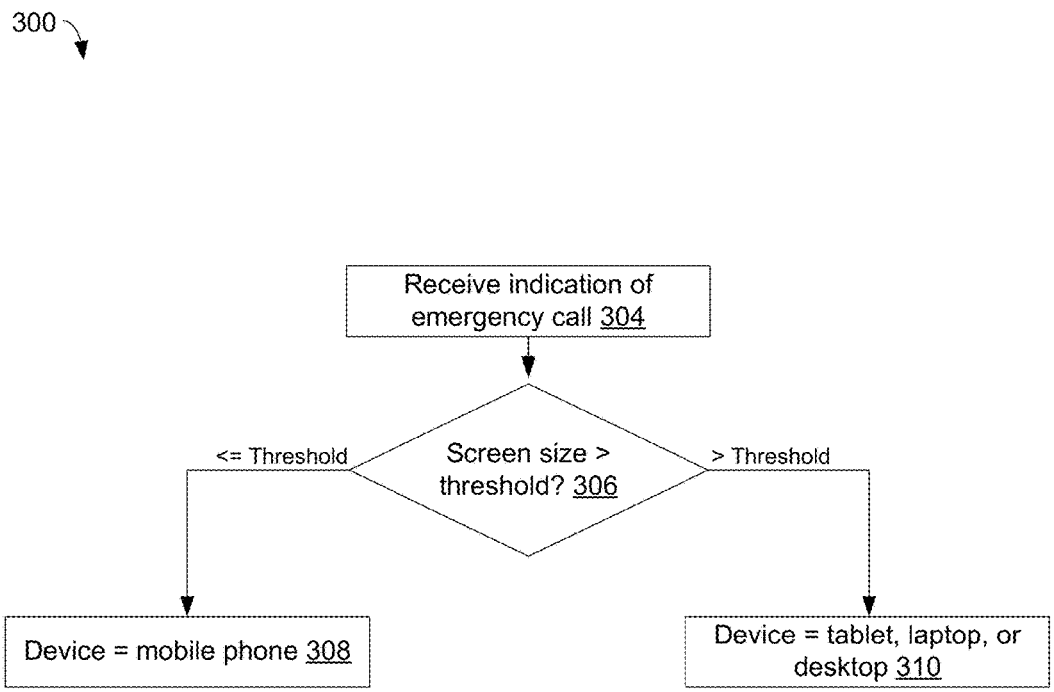
FIG. 3 illustrates a flow diagram of example operating procedures for determining whether a telephony application that implements emergency calling executes on a mobile phone or a tablet.

FIG. 3 illustrates a flow diagram of example operating procedures 300 for determining whether a telephony application that implements emergency calling executes on a mobile phone or a tablet. It can be appreciated that the operating procedures of FIG. 3 are example operating procedures, and that there can be examples that implement more or fewer operations than are depicted, or that implement the operations in a different order than is depicted here. For instance, in some examples, operations 306-310 of determining whether a telephony application executes on a mobile phone or on a tablet can be implemented to occur before operation 304 where user input indicative of placing an emergency call is received.

It can also be appreciated that multiple of the operating procedures of FIGS. 3-8 can be implemented together. For example, the operating procedures of FIG. 3 can be implemented to determine whether the telephony application is executing on a mobile phone or on a tablet, and then the operating procedures of FIG. 4 can be implemented to place the emergency call on a mobile phone, and the operating procedures of FIG. 5 can be implemented to place the emergency call on a tablet.

In some examples, the example operating procedures 300 of FIG. 3 can be implemented by one or more of tablet 102a-c and mobile phone 104a-c of FIG. 1 as the one or more of those tablets and mobile phones executes a telephony application that provides for emergency calling.

Operating procedures 300 begin with operation 304. Operation 304 depicts receiving user input indicative of placing an emergency call at a telephony application. In some examples, a telephony application that provides telephony services can provide a user interface that includes a phone dialer functionality, or otherwise has a user interface element that indicates contacting an emergency service. In operation 304, user input can be received at this user interface that indicates an intent to place an emergency call with the telephony application.

In some examples, operation 304 comprises executing a telephony application on a user device, and then receiving user input at a user interface of the telephony application indicative of placing a telephone call to an emergency service. In some examples, operation 304 comprises receiving user input at a user interface of a telephony application executed on the user device that is indicative of placing a telephone call to an emergency service. After operation 304, the operating procedures of FIG. 3 move to operation 306.

Operation 306 depicts determining a screen size of a user device upon which the telephony application executes. In some examples, a user device's operating system can provide an application programming interface (API) call that the telephony application can invoke to determine a screen size of the user device. In such examples, in operation 306, the screen size of the user device upon which the telephony application executes can be determined by involving this API call. In some examples, operation 306 comprises determining a size of a screen of the computing device.

Where in operation 306 it is determined that the screen size of the user device upon which the telephony application executes is less than or equal to a predetermined threshold size, then the operating procedures of FIG. 3 move to operation 308. Instead, where in operation 306 it is determined that the screen size of the user device upon which the telephony application executes is greater than a predetermined threshold size, then the operating procedures of FIG. 3 move to operation 310.

Operation 308 is reached from operation 306 where, in operation 306, it is determined that the screen size of the user device upon which the telephony application executes is less than or equal to a predetermined threshold size. Operation 308 depicts determining that the user device upon which the telephony application executes is a mobile phone.

This screen size and predetermined threshold can be measured in a variety of units, such as pixel resolution of the screen, or a diagonal length of the screen. Using the diagonal length example, the predetermined threshold size can be set so that, generally, tablets have screens larger than the predetermined threshold size, and phones have screen less than or equal to the predetermined threshold size.

For example, where it is determined that a diagonal length of mobile phone screens is generally less than or equal to six inches, and that a diagonal length of tablet screens is generally greater than six inches, the predetermined threshold size can be set to be six inches. In some examples, operation 308 comprises, if the size of the screen of the computing device is determined to correspond to a mobile phone, invoking a dialer functionality of an operating system of the computing device to place the telephone call to the emergency service. After operation 308, the operating procedures of FIG. 3 end.

Operation 310 is reached from operation 306 where, in operation 306, it is determined that the screen size of the user device upon which the telephony application executes greater than a predetermined threshold size. Operation 310 depicts determining that the user device upon which the telephony application executes is a tablet.

In some examples, operation 310 comprises, if the size of the screen of the user device is determined to correspond to a tablet, invoking a URN from the telephony application to place the telephone call to the emergency service. In some examples, operation 310 comprises, if the size of the screen of the user device is determined to correspond to a laptop computer or a desktop computer, invoking a URN from the telephony application to place the telephone call to the emergency service. In some examples, operation 310 comprises, if the size of the screen of the user device is determined to correspond to a user device other than a mobile phone, invoking a URN from the telephony application to place the telephone call to the emergency service.

In some examples, operation 310 comprises, providing a physical location information of the system along with invoking a URN from the telephony application to place the telephone call to the emergency service. In some examples, the physical location information comprises at least one of a longitude corresponding to a physical location of the system and a latitude corresponding to the physical location of the system.

In some examples, the telephony application supports dialing from a plurality of phone numbers, and operation 310 comprises determining a first phone number of the plurality of phone numbers with which to place the emergency call. In some examples, where the telephony application utilizes a telephone number with which to place calls to other telephone numbers, and a second telephony application on a second computing device utilizes the telephone number with which to place calls to other telephone numbers, operation 308 comprises associating the telephone call to the emergency service with the computing device.

In some examples, operation 308 comprises prioritizing a quality of service (QoS) of a voice communication originated by the telephony application over at least some other data transmitted across a communications network utilized by the voice communication. In some examples, operation 308 comprises prioritizing the QoS of the voice communication across a plurality of radio access networks (RANs) of the communications network.

In addition to prioritizing a QoS of a voice communication over at least some other data being transmitted, operation 308 can comprise prioritizing a QoS of an emergency call over a QoS of a non-emergency call. Additionally, the voice communication originated by the telephony application can be effectuated at VoLTE quality, with seamless handoffs between eNBs of a telecommunications network. After operation 310, the operating procedures of FIG. 3 end.

Implementing a Telephony Application Emergency Call on a Mobile Phone

Figure 4:
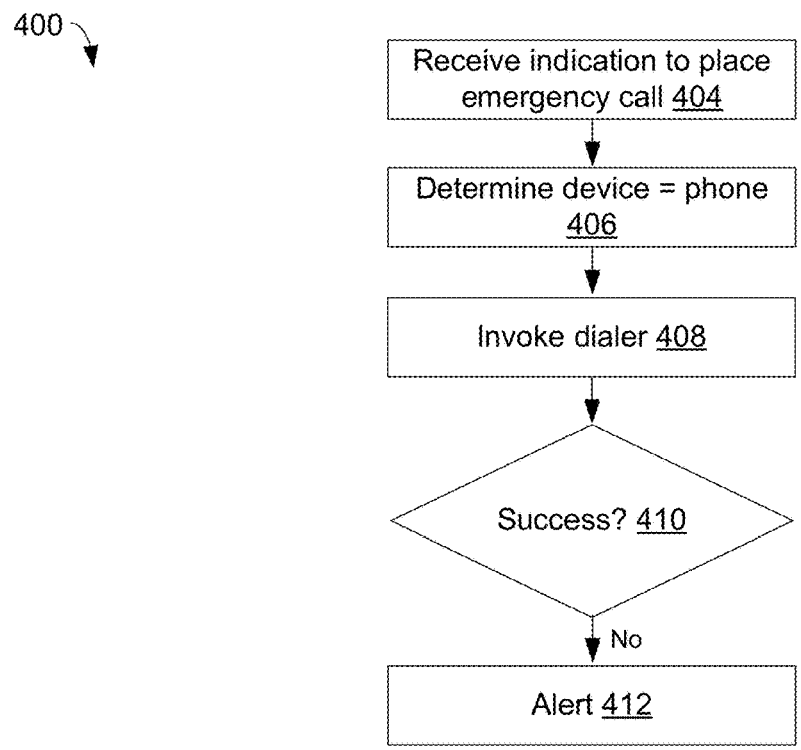
FIG. 4 illustrates a flow diagram of example operating procedures for a mobile phone implements emergency calling with a telephony application.

FIG. 4 illustrates a flow diagram of example operating procedures 400 for a mobile phone implements emergency calling with a telephony application. It can be appreciated that the operating procedures of FIG. 4 are example operating procedures, and that there can be examples that implement more or fewer operations than are depicted, or that implement the operations in a different order than is depicted here.

In some examples, the example operating procedures 400 of FIG. 4 can be implemented by one or more of mobile phone 104a-c of FIG. 1 as the one or more of those mobile phones executes a telephony application that provides for emergency calling.

Operating procedures 400 begin with operation 404. Operation 404 depicts receiving user input indicative of placing an emergency call. In some examples, operation 404 can be implemented in a similar manner as operation 304 of FIG. 3. After operation 404, the operating procedures of FIG. 4 move to operation 406.

Operation 406 depicts determining that the user device is a mobile phone. In some examples, operation 406 can be implemented in a similar manner as operations 306-308 of FIG. 3, where in FIG. 3 the user device upon which the telephony application executes is determined to be a mobile phone. After operation 406, the operating procedures of FIG. 4 move to operation 408.

Operation 408 depicts invoking a dialer functionality of the mobile phone. In some examples, a mobile phone can execute an operating system that offers dialer functionality that is configured to receive user input regarding a telephone number to be dialed, and to place a telephone call to that number. A mobile phone can have components used to effectuate placing a telephone call, such as cellular radios.

This functionality offered by a mobile phone can be seen in contrast to other computing devices that omit dialer functionality, such as some tablets, laptop computers, and desktop computers. These other computing devices can omit some aspect used to effectuate a telephone call, such as by omitting dialer functionality software or cellular radios.

In operation 408, invoking a dialer functionality of the mobile phone can comprise a telephony application making an API call to an operating system of the mobile device to invoke the dialer functionality to place an emergency call as specified via the user input of operation 404.

Figure 7:
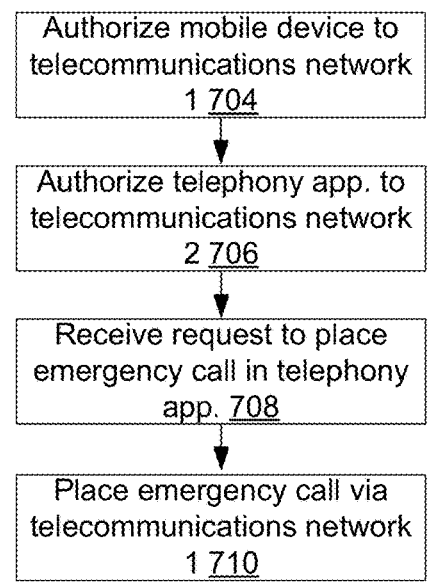
FIG. 7 illustrates a flow diagram of example operating procedures for placing an emergency call from within a telephony application that is authenticated to a first telecommunications network with a mobile device that is authenticated to a second telecommunications network.

There can be examples where the telephony application is registered to a first telecommunications network, and the mobile phone that the telephony application executes on is registered to a second telecommunications network, such as described with respect to the operating procedures of FIG. 7. In such examples, when the dialer functionality is invoked by the telephony application, the call takes place across the second telecommunications network even though the telephony application is registered to the first telecommunications network, because the dialer functionality uses the network that the mobile phone is registered to effectuate the emergency call. Put another way, when the mobile phone's dialer functionality is invoked to place the emergency call, the emergency call is routed to an appropriate public safety access point (PSAP) via the second telecommunications network rather than via the first telecommunications network. After operation 408, the operating procedures of FIG. 4 move to operation 410.

Operation 410 depicts determining whether invoking the dialer functionality in operation 408 was successful. In some examples, the telephony application invokes an API call in operation 408, and as a result of that invoked API call, the telephony application receives an indication from the operating system of the mobile device of whether invoking the dialer functionality in operation 408 was successful. In other examples, the telephony application invokes one or more additional API calls after invoking the API call in operation 408, where a result of invoking the one or more additional API calls that is returned to the telephony application indicates whether invoking the dialer functionality in operation 408 was successful. An example of why invoking the dialer functionality in operation 408 can have been unsuccessful is that the mobile phone lacked cellular service when the attempt to invoke the dialer functionality in operation 408 was made.

Where in operation 410 it is determined that invoking the dialer functionality in operation 408 was successful, then the operating procedures of FIG. 4 end. Instead, where in operation 410 it is determined that invoking the dialer functionality in operation 408 was not successful, then the operating procedures of FIG. 4 move to operation 412.

Operation 412 is reached from operation 410 where, in operation 410, it is determined that invoking the dialer functionality in operation 408 was not successful. Operation 412 depicts alerting a user of the mobile phone to place the emergency call outside of the telephony application. Alerting a user of the mobile phone to place the emergency call outside of the telephony application can comprise displaying a message in a user interface of the mobile phone, such as on display 208 of FIG. 2 where the mobile phone is implemented in computing device 200 of FIG. 2. In some examples, once dialer functionality is invoked, the call is passed from the telephony application to an operating system of the mobile phone. In such examples, if invoking the dialer functionality fails, instead of passing the call back from the operating system of the mobile phone to the telephony application, it is the operating system of the mobile phone that alerts the user of the mobile phone to place the emergency call outside of the telephony application.

In some examples, operation 412 comprises, in response to determining that invoking a dialer functionality of the operating system of the computing device to place the telephone call to the emergency service failed, displaying an alert on the screen of the computing device to place the emergency call independent of the telephony application. After operation 412, the operating procedures of FIG. 4 end.

Implementing a Telephony Application Emergency Call on a Tablet Device

Figure 5:
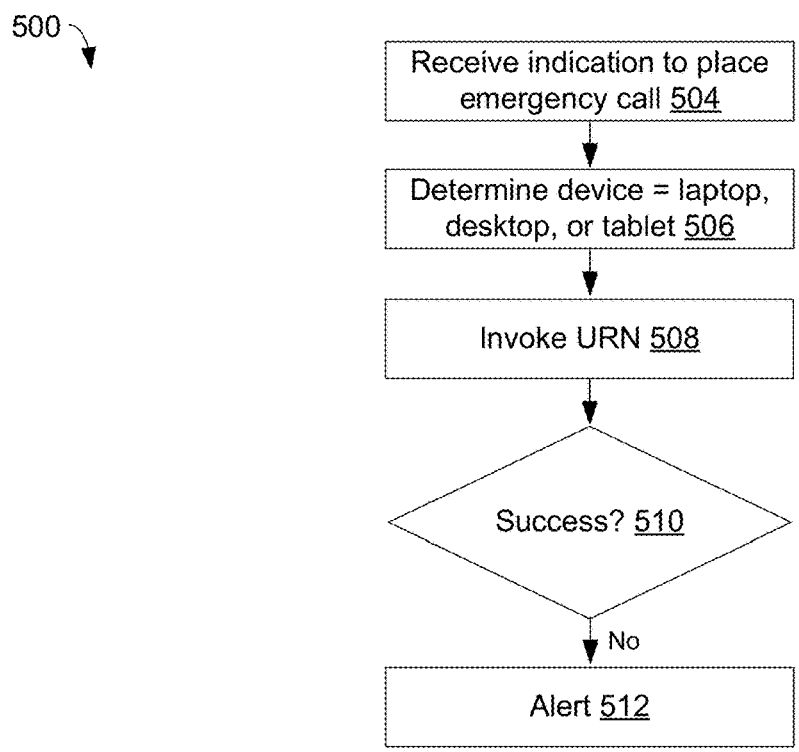
FIG. 5 illustrates a flow diagram of example operating procedures for a tablet that implements emergency calling with a telephony application.

FIG. 5 illustrates a flow diagram of example operating procedures 500 for a tablet that implements emergency calling with a telephony application. It can be appreciated that the operating procedures of FIG. 5 are example operating procedures, and that there can be examples that implement more or fewer operations than are depicted, or that implement the operations in a different order than is depicted here. For instance, in some examples, operation 512, which involves alerting a user of the tablet, can be omitted so that, if a URN cannot be invoked to place the emergency call in operations 508-510, then no alert is displayed indicating to the user to contact the emergency service outside of the telephony application.

In some examples, the example operating procedures 500 of FIG. 5 can be implemented by one or more of tablet 102a-c of FIG. 1 as the one or more of those tablets executes a telephony application that provides for emergency calling.

Operating procedures 500 begin with operation 504. Operation 504 depicts receiving user input indicative of placing an emergency call. In some examples, operation 504 can be implemented in a similar manner as operation 304 of FIG. 3. After operation 504, the operating procedures of FIG. 5 move to operation 506.

Operation 506 depicts determining that the user device is a tablet. In some examples, operation 506 can be implemented in a similar manner as operations 306 and 310 of FIG. 3, where in FIG. 3 the user device upon which the telephony application executes is determined to be a tablet. After operation 506, the operating procedures of FIG. 5 move to operation 508.

Operation 508 depicts invoking a URN to place the emergency call. In some examples, operation 508 can be implemented in a similar manner as operation 412 of FIG. 4, which depicts invoking a URN to place an emergency call. After operation 508, the operating procedures of FIG. 5 move to operation 510.

Operation 510 depicts determining whether invoking the URN to place the emergency call in operation 508 was successful. In some examples, operation 510 can be implemented in a similar manner as operation 414 of FIG. 4, which also depicts determining whether invoking a URN to place an emergency call was successful.

Where in operation 510 it is determined that invoking the URN to place the emergency call in operation 508 was successful, then the operating procedures of FIG. 5 end. Instead, where in operation 510 it is determined that invoking the URN to place the emergency call in operation 508 was not successful, then the operating procedures of FIG. 5 move to operation 512.

Operation 512 is reached from operation 510 where, in operation 510, it is determined that invoking the URN to place the emergency call in operation 508 was not successful. Operation 512 depicts alerting a user of the tablet to place the emergency call outside of the telephony application. In some examples, operation 512 can be implemented in a similar manner as operation 416 of FIG. 4, which also depicts alerting a user to place the emergency call outside of the telephony application. After operation 512, the operating procedures of FIG. 5 end.

Handling Emergency and Non-Emergency Calls with a Telephony Application

Figure 6:
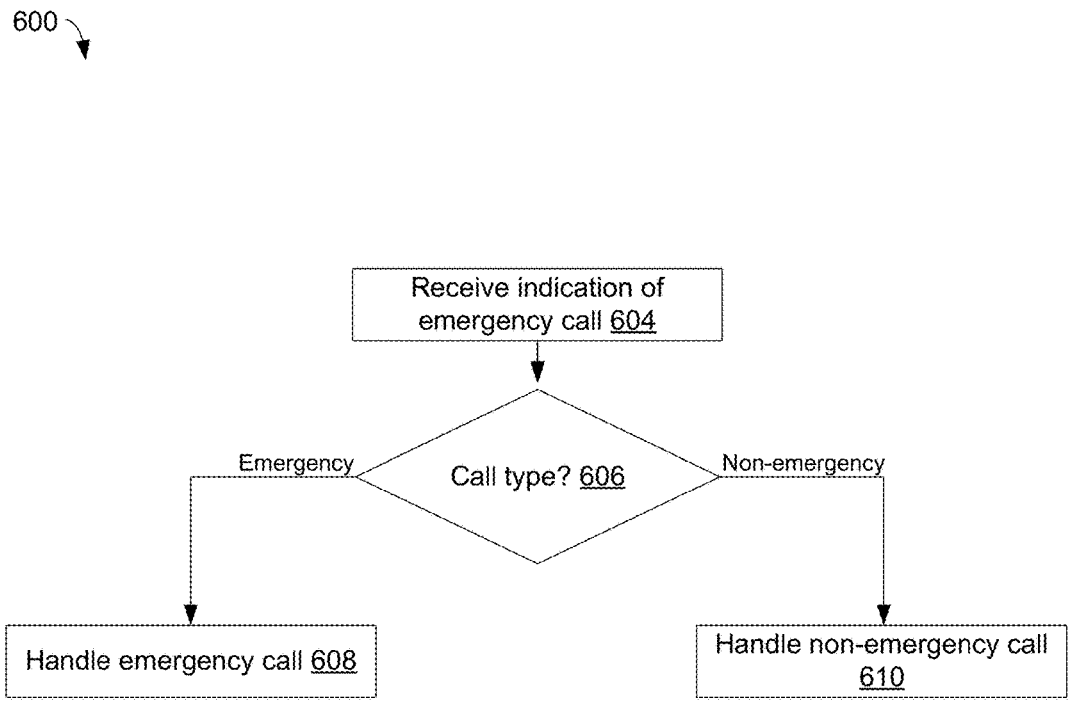
FIG. 6 illustrates a flow diagram of example operating procedures for handling emergency and non-emergency calls with a telephony application.

FIG. 6 illustrates a flow diagram of example operating procedures 600 for handling emergency and non-emergency calls with a telephony application. It can be appreciated that the operating procedures of FIG. 6 are example operating procedures, and that there can be examples that implement more or fewer operations than are depicted, or that implement the operations in a different order than is depicted here.

In some examples, the example operating procedures 600 of FIG. 6 can be implemented by one or more of tablets 102a-c and mobile phones 104a-c of FIG. 1 as the one or more of those devices executes a telephony application that provides for emergency calling and non-emergency calling.

Operating procedures 600 begin with operation 604. Operation 604 depicts receiving user input indicative of placing a call. In some examples, operation 604 can be implemented in a similar manner as operation 304 of FIG. 3 (which depicts receiving user input indicative of placing an emergency call), as applied to both emergency calls and non-emergency calls. For example, a user interface can allow for the input of telephone numbers for both emergency services and non-emergency services. After operation 604, the operating procedures of FIG. 6 move to operation 606.

Operation 606 depicts determining a call type of the call. In some examples, the telephony application can store an indication of phone numbers that correspond to emergency calls (e.g., 911 in the United States). In such examples, determining a type of the call can comprise comparing the number received in operation 606 and comparing that number to the stored indication of phone numbers that correspond to emergency calls.

Where there is a match between the number received in operation 606 and one of the stored indication of phone numbers that correspond to emergency calls, it can be determined that the call type is an emergency call. Instead, where there is not a match between the number received in operation 606 and one of the stored indication of phone numbers that correspond to emergency calls, it can be determined that the call type is a non-emergency call.

Where in operation 606 it is determined that the call type of the call is emergency, then the operating procedures of FIG. 6 move to 608. Instead, where in operation 606 it is determined that the call type of the call is non-emergency, then the operating procedures of FIG. 6 move to operation 610.

Operation 608 is reached from operation 606 where, in operation 606, it is determined that the call type of the call is emergency. Operation 608 depicts handling the call as an emergency call. In some examples, handling the call as an emergency call can be implemented based on the type of user device upon which the telephony application executes—e.g., mobile phone, tablet, desktop computer, or laptop computer.

Where the type of user device upon which the telephony application executes is a mobile phone, handling the call as an emergency call can be implemented in a similar manner as the operating procedures of FIG. 4, which generally depicts implementing emergency calls in a telephony application that is executing on a mobile phone. Instead, where the type of user device upon which the telephony application executes is a tablet, laptop computer, or desktop computer, handling the call as an emergency call can be implemented in a similar manner as the operating procedures of FIG. 5, which generally depicts implementing emergency calls in a telephony application that is executing on a tablet, desktop computer, or laptop computer. After operation 608, the operating procedures of FIG. 6 end.

Operation 610 is reached from operation 606 where, in operation 606, it is determined that the call type is non-emergency. Operation 610 depicts handling the call as a non-emergency call. In some examples, the telephony application can implement non-emergency calls using a voice over Internet Protocol (IP) (VoIP) protocol. After operation 610, the operating procedures of FIG. 6 end.

Placing an Emergency Call on a Telecommunications Network of a Mobile Device that Differs from a Telecommunications Network of a Telephony Application FIG. 7 illustrates a flow diagram of example operating procedures 700 for placing an emergency call from within a telephony application that is authenticated to a first telecommunications network with a mobile device that is authenticated to a second telecommunications network. It can be appreciated that the operating procedures of FIG. 7 are example operating procedures, and that there can be examples that implement more or fewer operations than are depicted, or that implement the operations in a different order than is depicted here.

In some examples, the example operating procedures 700 of FIG. 7 can be implemented by one or more of mobile phones 104a-c of FIG. 1 as the one or more of those devices executes a telephony application that provides for emergency calling and non-emergency calling.

Operating procedures 700 begin with operation 704. Operation 704 depicts authenticating a mobile device to a first telecommunications network. In some examples, authenticating a mobile device to a first telecommunications network can comprise the mobile device and components of the first telecommunications network exchanging communications, including the mobile device sending an International Mobile Subscriber Identity (IMSI) to the first telecommunications network, which is verified by a HSS of the first telecommunications network. After operation 704, the operating procedures of FIG. 7 move to operation 706.

Operation 706 depicts authenticating credentials of a telephony application to a second telecommunications network. A telephony application can be authenticated to a different telecommunications network than a telecommunications network that the associated user device is authenticated to.

Here, operation 706 can comprise the telephony application sending a user name and a password to the second telecommunications network using a communications channel between the user device and the first telecommunications network, and the second telecommunications network validating that the user name and password correspond to a valid account with the second telecommunications network.

In some examples, operation 706 comprises authenticating the telephony application to a telecommunications network with credentials provided by the telephony application to the telecommunications network. In some examples, operation 706 comprises authenticating the telephony application to an IP multimedia subsystem (IMS) core of a telecommunications network. An IMS core can be located in data center 118 of FIG. 1, and include HSS 120. In some examples, the system is authenticated to a first telecommunications network, and the telephony application is authenticated to a second telecommunications network. After operation 706, the operating procedures of FIG. 7 move to operation 708.

Operation 708 depicts receiving user input to the telephony application indicative of placing an emergency call. In some examples, operation 708 can be implemented in a similar manner as operation 304 of FIG. 3, which generally depicts receiving user input to a telephony application indicative of placing an emergency call. After operation 708, the operating procedures of FIG. 7 move to operation 710.

Operation 710 depicts placing the emergency call via the first telecommunications network. In some examples, the associated user device is a mobile phone, and placing an emergency call via the telephony application comprises invoking a dialer functionality of the mobile phone to place the emergency call. Since the mobile phone is authenticated to the first telecommunications network, this emergency call can then be made via the first telecommunications network. After operation 710, the operating procedures of FIG. 7 end.

Figure 8:
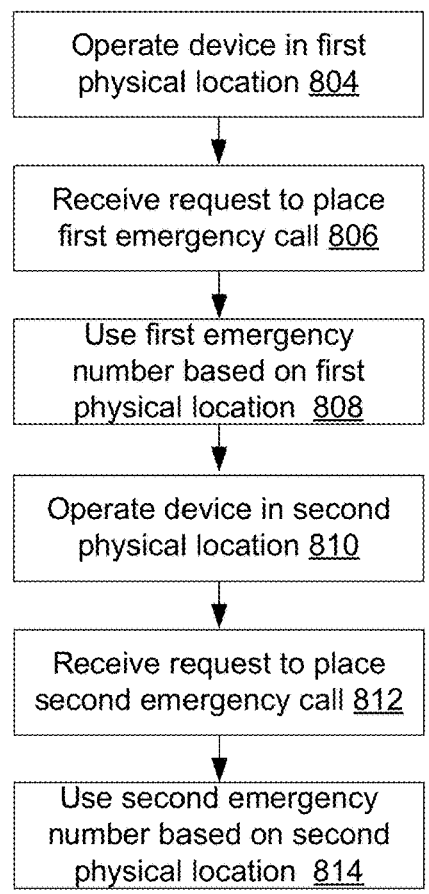
FIG. 8 illustrates a flow diagram of example operating procedures for routing emergency calls with a telephony application based on a physical location of the user device.

Routing Emergency Calls Placed to a Telephony Application Based on a Physical Location of the User Device FIG. 8 illustrates a flow diagram of example operating procedures 800 for routing emergency calls with a telephony application based on a physical location of the user device. It can be appreciated that the operating procedures of FIG. 8 are example operating procedures, and that there can be examples that implement more or fewer operations than are depicted, or that implement the operations in a different order than is depicted here.

In some examples, the example operating procedures 800 of FIG. 8 can be implemented by one or more of tablets 102a-c and mobile phones 104a-c of FIG. 1 as the one or more of those devices executes a telephony application that provides for emergency calling and non-emergency calling.

Operating procedures 800 begin with operation 804. Operation 804 depicts operating the user device in a first physical location. In some examples, operating the user device in a first physical location can comprise having the user device powered on and communicating with one or more networks (such as telecommunications network 1 126a of FIG. 1). This first physical location can be a physical location that has one or more predefined phone numbers for one or more emergency services (e.g., 911 for emergency services in the United States).

In some examples, operation 804 comprises determining a first telephone number for the emergency service based on a first physical location of the computing device. After operation 804, the operating procedures of FIG. 8 move to operation 806.

Operation 806 depicts receiving user input to the telephony application indicative of placing a first emergency call. In some examples, operation 806 can be implemented in a similar manner as operation 304 of FIG. 3, which generally depicts receiving user input to a telephony application indicative of placing an emergency call. Rather than a specific number being input, this user input can comprise invoking a user interface element that generally indicates contacting an emergency service via telephone, without regard to a specific telephone number for that emergency service. After operation 806, the operating procedures of FIG. 8 move to operation 808.

Operation 808 depicts placing the first emergency call to a first emergency call number based on the first physical location. In some examples, the telephony application directs the emergency call to a URN, such as urn:service:sos, and the network to which the telephony application is registered determines a phone number to direct the emergency call (e.g., 911 in the United States, or 112 in England). The telephony application can also transmit an indication of the first physical location to the telecommunications network along with the URN. The telephony application can determine the first physical location by invoking an API call to determine global positioning system (GPS) coordinates of the user device.

In some examples, operation 808 comprises placing the telephone call to the emergency service with the first telephone number. After operation 808, the operating procedures of FIG. 8 move to operation 810.

Operation 810 depicts operating the user device in a second physical location. In some examples, operation 810 can be implemented in a similar manner as operation 804, but as applied to a second physical location that differs from the first physical location of operation 804. That is, the user device can have been physically moved between operation 804 and operation 810.

In some examples, operation 810 comprises after the computing device has been moved from the first physical location to a second physical location, receive user input that is indicative of placing a second telephone call to the emergency service. In some examples, operation 810 comprises determining a second telephone number for the emergency service based on the second physical location of the computing device. After operation 812, the operating procedures of FIG. 8 move to operation 812.

Operation 812 depicts receiving user input to the telephony application indicative of placing a second emergency call. In some examples, operation 812 can be implemented in a similar manner as operation 806, but with a second emergency call as opposed to the first emergency call of operation 806. In some examples, operation 812 comprises placing the telephone call to the emergency service with the second telephone number. After operation 812, the operating procedures of FIG. 8 move to operation 814.

Operation 814 depicts placing the second emergency call using a second emergency call number based on the second physical location. In some examples, operation 814 can be implemented in a similar manner as operation 808, but with regard to the second emergency call as opposed to the first emergency call of operation 808. After operation 814, the operating procedures of FIG. 8 end.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   executing a telephony application on a computing device;
   receiving a user input at a user interface of the telephony application, the user input being indicative of placing a telephone call to an emergency service;
   determining, via the telephony application, a size of a screen of the computing device; and
   invoking a dialer functionality of an operating system of the computing device to place the telephone call to the emergency service, based at least in part on the size of the screen of the computing device being less than or equal to a predetermined size threshold.

2. The method of claim 1, further comprising:
in response to determining that the size of the screen of the computing device is greater than the predetermined size threshold, invoking a uniform resource name (URN) from the telephony application to place the telephone call to the emergency service.

3. The method of claim 1, further comprising:
determining that the computing device corresponds to at least one of a tablet, a laptop computer, or a desktop computer, based at least in part on the size of the screen of the computing device being greater than the predetermined size threshold.

4. The method of claim 1, further comprising:
authenticating the telephony application to a telecommunications network with credentials provided by the telephony application to the telecommunications network.

5. The method of claim 1, wherein the telephony application supports dialing from a plurality of phone numbers, and further comprising:
determining a first phone number of the plurality of phone numbers with which to place the telephone call to the emergency service.

6. The method of claim 1, wherein the telephony application utilizes a telephone number with which to place calls to other telephone numbers, and wherein a second telephony application on a second computing device utilizes the telephone number with which to place calls to other telephone numbers, and further comprising:
associating the telephone call to the emergency service with the computing device.

7. The method of claim 1, further comprising:
prioritizing a quality of service (QoS) of the telephone call to the emergency service over a non-emergency call.

8. A system, comprising:
at least one processor; and
at least one memory communicatively coupled to the at least one processor, the at least one memory bearing processor-executable instructions that, upon execution by the at least one processor, cause the system to at least:
authenticate the system to a first telecommunications network;
authenticate a telephony application executed on the system to a second telecommunications network, the second telecommunications network being different from the first telecommunications network;
receive a user input at a user interface of the telephony application that is indicative of placing a telephone call to an emergency service;
determine a size of a screen of the system; and
invoke a placement of the telephone call to the emergency service over the second telecommunications network, based at least in part on the size of the screen of the system.

9. The system of claim 8, wherein the processor-executable instructions that, upon execution by the at least one processor, further cause the system to at least:
in response to determining that the size of the screen of the system is greater than a predetermined size threshold, invoke a uniform resource name (URN) from the telephony application to place the telephone call to the emergency service.

10. The system of claim 8, wherein the processor-executable instructions that, upon execution by the at least one processor, further cause the system to at least:
authenticate the telephony application to an Internet Protocol (IP) multimedia subsystem (IMS) core of a telecommunications network.

11. The system of claim 8, wherein the processor-executable instructions that, upon execution by the at least one processor, further cause the system to at least:
prioritize a quality of service (QoS) of a voice communication originated by the telephony application over at least some other data transmitted across a communications network utilized by the voice communication.

12. The system of claim 11, wherein the processor-executable instructions that, upon execution by the at least one processor, further cause the system to at least:
prioritize the QoS of the voice communication across a plurality of radio access networks (RANs) of the communications network.

13. A non-transitory computer-readable storage medium, bearing computer-executable instructions that, when executed upon a computing device, cause the computing device to at least:
receive a user input at a user interface of a telephony application of the computing device that is indicative of placing a telephone call to an emergency service;
determine a size of a screen of the computing device; and
invoke a uniform resource name (URN) from the telephony application to place the telephone call to the emergency service, based at least in part on the size of the screen being greater than a predetermined size threshold.

14. The non-transitory computer-readable storage medium of claim 13, further bearing computer-executable instructions that, when executed upon the computing device, cause the computing device to at least:
provide a physical location information of the computing device along with invoking the URN from the telephony application to place the telephone call to the emergency service.

15. The non-transitory computer-readable storage medium of claim 14, wherein the physical location information comprises at least one of a longitude corresponding to a physical location of the computing device and a latitude corresponding to the physical location of the computing device.

16. The non-transitory computer-readable storage medium of claim 13, further bearing computer-executable instructions that, when executed upon the computing device, cause the computing device to at least:
invoke a dialer functionality of an operating system of the computing device to place the telephone call to the emergency service, based at least in part on the size of the screen being less than or equal to the predetermined size threshold;
determine a first telephone number for the emergency service based on a first physical location of the computing device; and
place the telephone call to the emergency service with the first telephone number.

17. The non-transitory computer-readable storage medium of claim 16, further bearing computer-executable instructions that, when executed upon the computing device, cause the computing device to at least:
after the computing device has been moved from the first physical location to a second physical location, receive user input that is indicative of placing a second telephone call to the emergency service;

determine a second telephone number for the emergency service based on the second physical location of the computing device; and place the telephone call to the emergency service with the second telephone number.

18. The non-transitory computer-readable storage medium of claim 16, further bearing computer-executable instructions that, when executed upon the computing device, cause the computing device at least to:

in response to determining that invoking the dialer functionality of the operating system of the computing device to place the telephone call to the emergency service failed, display an alert on the screen of the computing device to place the telephone call to the emergency service independent of the telephony application.

19. The non-transitory computer-readable storage medium of claim 13, further bearing computer-executable instructions that, when executed upon the computing device, cause the computing device to at least:

detect a pixel resolution of the screen associated with the computing device, and wherein, to determine the size of the screen of the computing device is based at least at least in part on the pixel resolution.

20. The non-transitory computer-readable storage medium of claim 13, further bearing computer-executable instructions that, when executed upon the computing device, cause the computing device to at least:

present a user interface element on the user interface of the telephony application, the user interface element being configured to contact the emergency service via telephone without regard to a specific telephone number for the emergency service, and wherein, the user input at the user interface of the telephony application corresponds to invoking the user interface element.

* * * * *